US008466963B2

(12) United States Patent
Chen et al.

(10) Patent No.: US 8,466,963 B2
(45) Date of Patent: Jun. 18, 2013

(54) SYSTEM AND METHOD FOR ADJUSTING IMAGE PARAMETERS OF CAMERAS

(75) Inventors: Yang-Yuan Chen, Taipei Hsien (TW); Ming-Chih Hsieh, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 606 days.

(21) Appl. No.: 12/818,118

(22) Filed: Jun. 17, 2010

(65) Prior Publication Data

US 2011/0141284 A1 Jun. 16, 2011

(30) Foreign Application Priority Data

Dec. 11, 2009 (CN) .......................... 2009 1 0311323

(51) Int. Cl.
*H04N 7/18* (2006.01)
*H04N 5/225* (2006.01)
*G06K 9/00* (2006.01)

(52) U.S. Cl.
USPC ...... 348/159; 348/207.11; 382/117; 382/118; 382/141

(58) Field of Classification Search
USPC .......................................................... 348/159
See application file for complete search history.

(56) References Cited

U.S. PATENT DOCUMENTS 6,529,613 B1 * 3/2003 Astle ............................ 382/103
7,792,335 B2 * 9/2010 Steinberg et al. ............. 382/118
7,889,886 B2 * 2/2011 Matsugu et al. ............. 382/103

* cited by examiner

*Primary Examiner* — Wing F Chan
*Assistant Examiner* — David X Yi
(74) *Attorney, Agent, or Firm* — Altis Law Group, Inc.

(57) ABSTRACT

A system and method for adjusting image parameters of cameras first determines if there are disqualified cameras whose image parameters need to be adjusted according to an image quality of the captured image of each camera, outputs the captured image of each of qualified cameras whose image parameters do not need to be adjusted, determines if the image parameters of each of the disqualified cameras are adjusted through a network. The image parameters are updated by each of the disqualified cameras itself if the image parameters of the disqualified camera are not adjusted through the network, or the image parameters of each of the disqualified cameras are updated by the computer using a broadcast mode or a non-broadcast mode with user-defined values if the image parameters of the disqualified camera are adjusted through network.

11 Claims, 4 Drawing Sheets

SYSTEM AND METHOD FOR ADJUSTING IMAGE PARAMETERS OF CAMERAS

BACKGROUND

1. Technical Field

Embodiments of the present disclosure relate to image processing technology, and particularly to a system and a method for adjusting the image parameters of cameras.

2. Description of Related Art

Currently, cameras are used to perform security surveillance by capturing images of specified areas, and sending the captured images to a monitoring computer. Sometimes, image parameters (e.g., a focal length) of the cameras need to be adjusted or updated by an operator according to different environments, so that the camera can obtain clearer images. For example, default image parameters in a flash memory of a camera need to be adjusted or updated if a current frequency of the main source changes from 50 Hz to 60 Hz.

However, if a plurality of cameras need to be adjusted, it is a time-consuming job to perform such operations on the plurality of cameras. Furthermore, the plurality of cameras must be rebooted to load new image parameters into the flash memories. Therefore, it is inconvenient for people to update the image parameters of the plurality of cameras concurrently.

What is needed, therefore, is an improved system and method for adjusting image parameters of cameras.

DETAILED DESCRIPTION

All of the processes described below may be embodied in, and fully automated via, functional code modules executed by one or more general purpose computers or processors. The code modules may be stored in any type of readable medium or other storage system. Some or all of the methods may alternatively be embodied in specialized hardware. Depending on the embodiment, the readable medium may be a hard disk drive, a compact disc, a digital video disc, or a tape drive.

Figure 1:
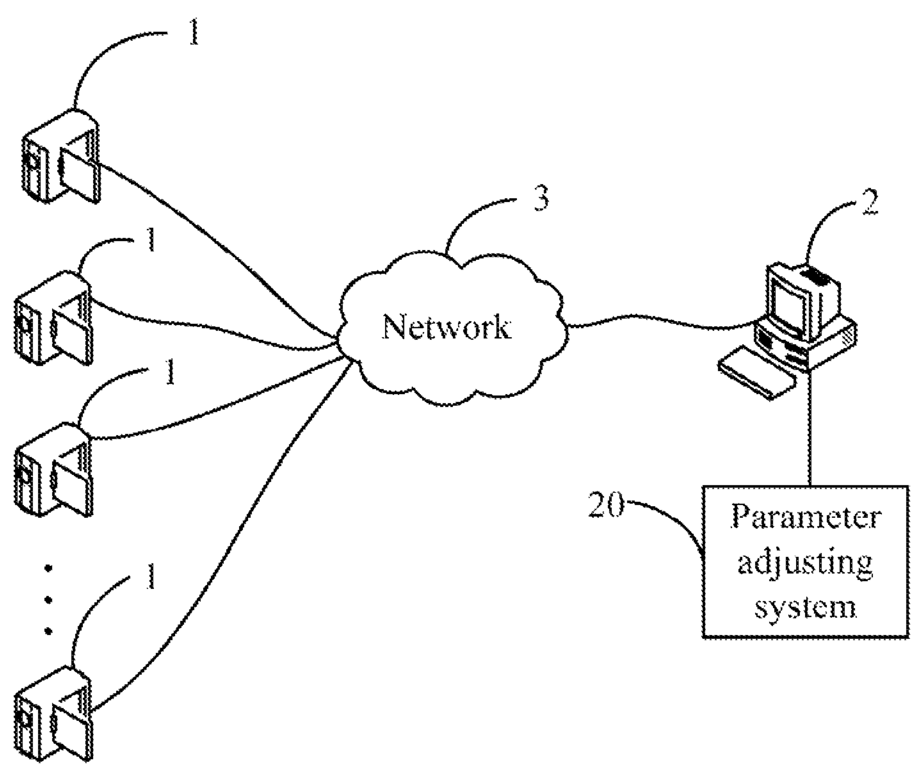
FIG. 1 is a schematic diagram of one embodiment of a computer comprising a parameter adjusting system for adjusting image parameters of cameras.

FIG. 1 is a schematic diagram of one embodiment of a computer 2 comprising a parameter adjusting system 20 for adjusting image parameters of cameras. The computer 2 is connected to a plurality of cameras 1 through a network 3. In one embodiment, the parameter adjusting system 21 may be used to automatically update image parameters of the plurality of cameras 1 synchronized with user-defined values using a broadcast mode through the network 3. A detailed description will be given in the following paragraphs.

Depending on the embodiment, the plurality of cameras 1 may be an Internet protocol (IP) camera, and the network 3 may be an intranet, the Internet or other suitable communication networks.

In one embodiment, the camera 1 may capture images, and send the captured images to the computer 2 through the network 3. Each of the plurality of cameras 1 is allocated a specified IP address, and the computer 2 can connect to each of the plurality of cameras 1 through the specified IP address.

Figure 2:
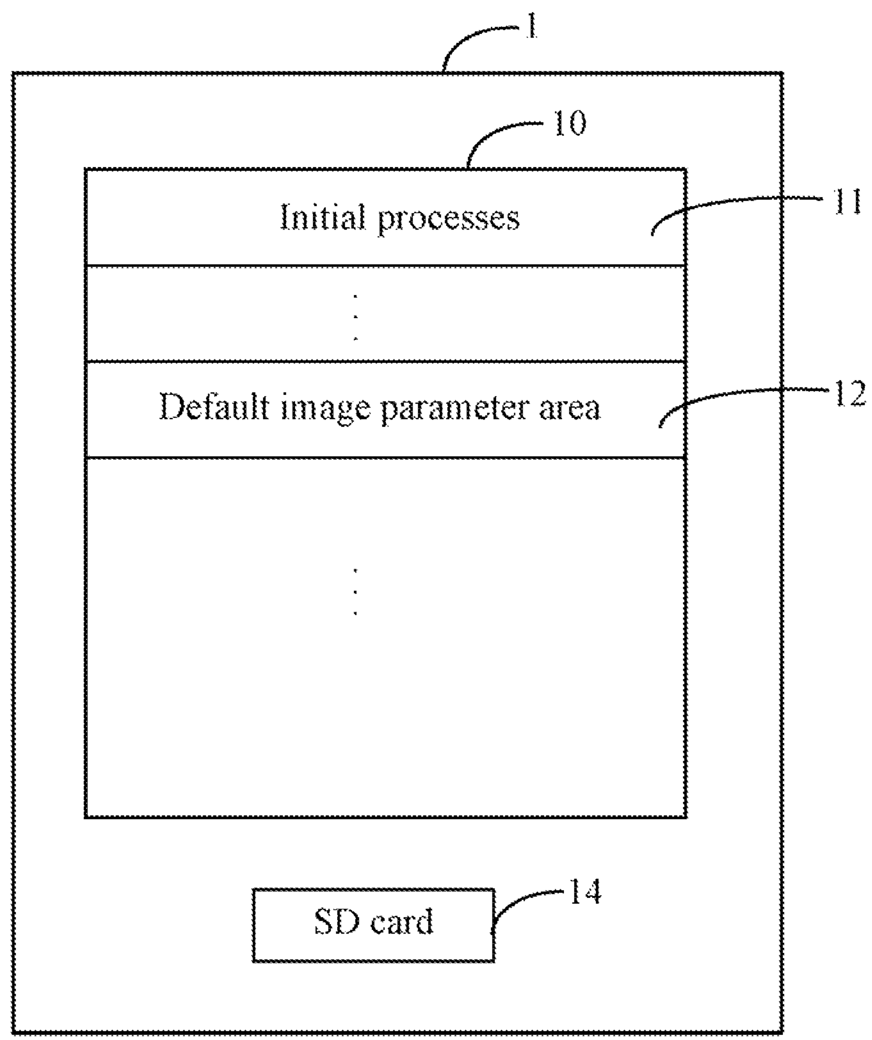
FIG. 2 is a block diagram of one embodiment of a camera.

FIG. 2 is a block diagram of one embodiment of the camera 1. The camera 1 includes a storage system 10. In one embodiment, the storage system 10 includes a default image parameter area 12, and initial processes 11 or other information may be stored in the storage system 10. The camera 1 further includes a secure digital (SD) card 14. The initial processes 11 are used to perform an initialization operation when the camera 1 is booted. In one embodiment, the default image parameter area 12 stores default image parameters of the camera 1, and the SD card 14 stores new image parameters of the camera 1. Thus, the default image parameters of the camera 1 can be updated with the new image parameters stored in the SD card 14. In one embodiment, the storage system 10 may be a flash memory.

Figure 3:
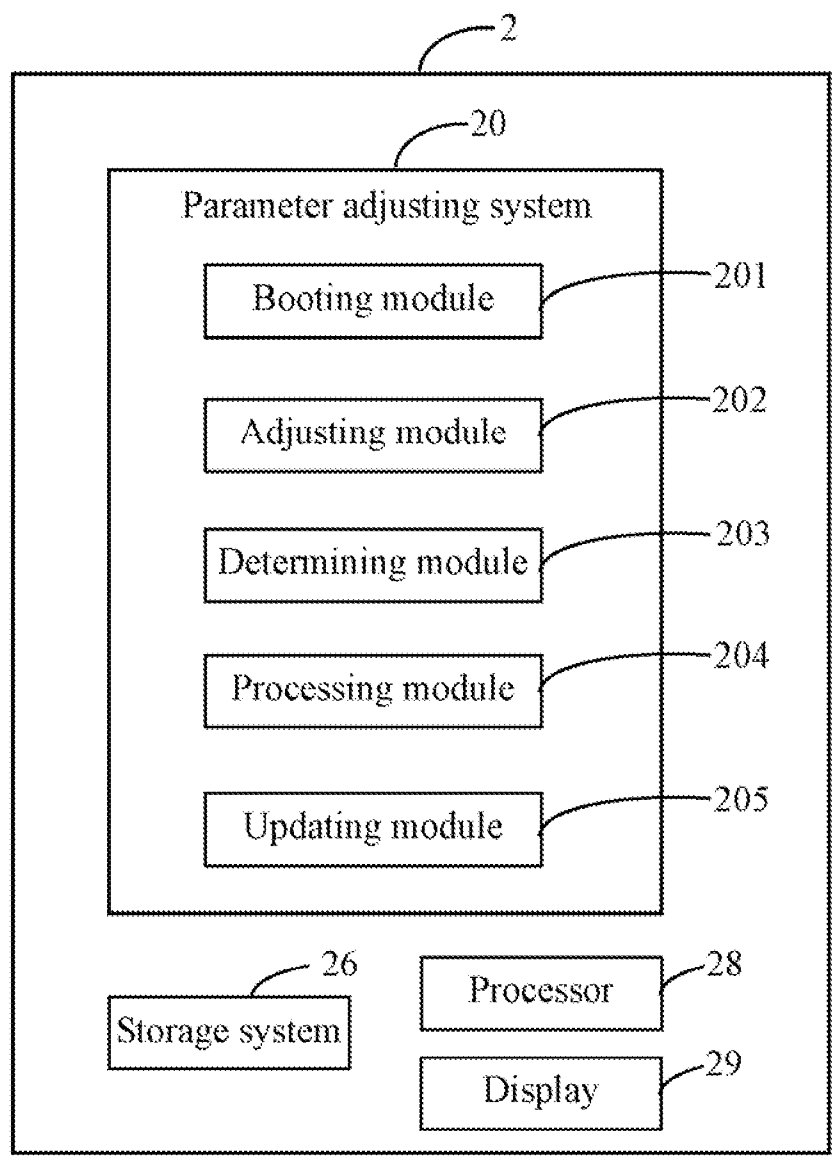
FIG. 3 is a block diagram of one embodiment of a parameter adjusting system of FIG. 1.

FIG. 3 is a block diagram of one embodiment of the parameter adjusting system 20 of FIG. 1. In one embodiment, the parameter adjusting system 20 includes a booting module 201, an adjusting module 202, a determining module 203, a processing module 204, and a updating module 205. In one embodiment, the modules 201-205 comprise one or more computerized instructions that are stored in a storage system 26 of the computer 2. A processor 28 of the computer 2 executes the computerized instructions to implement one or more operations of the computer 2.

The booting module 201 boots each of the plurality of cameras 1, and runs initial processes in each of the plurality of cameras 1 to perform an initialization operation for the initial processes.

The adjusting module 202 obtains image parameters (i.e., default image parameters) of each of the plurality of cameras 1 from the default image parameter area 12 of the storage system 10 of each of the plurality of cameras 1 through the network 3. The adjusting module 202 further adjusts an image quality of a captured image of each of the plurality of cameras 1 according to the image parameters. In one embodiment, the image parameters may be a focal length of the camera.

The determining module 203 determines if there are disqualified cameras 1 whose image parameters need to be adjusted according to the image quality of the captured image of each of the plurality of cameras 1. For example, if the image quality of the captured image of one of the plurality of cameras 1 is acceptable, the determining module 203 determines that the camera 1 is qualified, and the image parameters of the camera 1 do not need to be adjusted. If the image quality of the captured image of one of the plurality of cameras 1 is not acceptable, the determining module 203 determines that the camera 1 is disqualified, and the image parameters of the camera 1 need to be adjusted.

In one embodiment, if a definition of the captured image of one of the plurality of cameras 1 is greater than or equal to a standard definition (e.g., 100 points per inch), the determining module 203 determines that the image quality of the captured image of the camera 1 is acceptable (i.e., the camera 1 is qualified). If the definition of the captured image of the camera 1 is less than the standard definition, the determining module 203 determines that the image quality of the captured image of the camera 1 is not acceptable (i.e., the camera 1 is disqualified). In one embodiment, the definition of the captured image is the degree of clarity of the image captured by the camera.

The processing module 204 processes the captured image of each of qualified cameras 1 whose image parameters need not to be adjusted, and outputs a processed image of each of the qualified cameras 1 on a display 29 of the computer 2. In one embodiment, the processing module 204 processes the captured image of each of the qualified cameras 1 by filtering noise in the captured images of each of the qualified cameras.

The determining module 203 further determines if the image parameters of each of the disqualified cameras are adjusted by the computer 2 through the network 3.

The image parameters are updated by each of the disqualified cameras 1 itself if the image parameters of the disqualified cameras 1 are not adjusted by the computer 2 through the network 3. In one embodiment, each of the disqualified cameras 1 updates the default image parameters in the default image parameter area 12 with new image parameters stored in the SD card 14.

The determining module 203 further determines if the image parameters of each of the disqualified cameras 1 have been adjusted using a broadcast mode under the condition that the image parameters of the disqualified camera 1 are adjusted by the computer 2 through the network 3. In one embodiment, if a broadcast key of each of the disqualified cameras 1 is equal to zero, the determining module 203 determines that the image parameters of the disqualified cameras 1 have been adjusted using a non-broadcast mode. If the broadcast key of each of the disqualified cameras 1 is equal to one, the determining module 203 determines that the image parameters of the disqualified cameras 1 have been adjusted using the broadcast mode. Under the non-broadcast mode, the updating module 205 updates one camera 1 each time. Under the broadcast mode, the updating module 205 updates a plurality of cameras whose broadcast key is equal to one synchronized.

If the broadcast key of the disqualified camera 1 is equal to zero, the updating module 205 updates the image parameters in the default image parameter area 12 of the storage system 10 of each of the disqualified cameras 1 in succession with the user-defined values using the non-broadcast mode through the network 3.

If the broadcast key of the disqualified camera 1 is equal to one, the updating module 205 updates the image parameters in the default image parameter area 12 of the storage system 10 of each of the disqualified cameras 1 synchronized with the user-defined values using the broadcast mode through the network 3.

Figure 4:
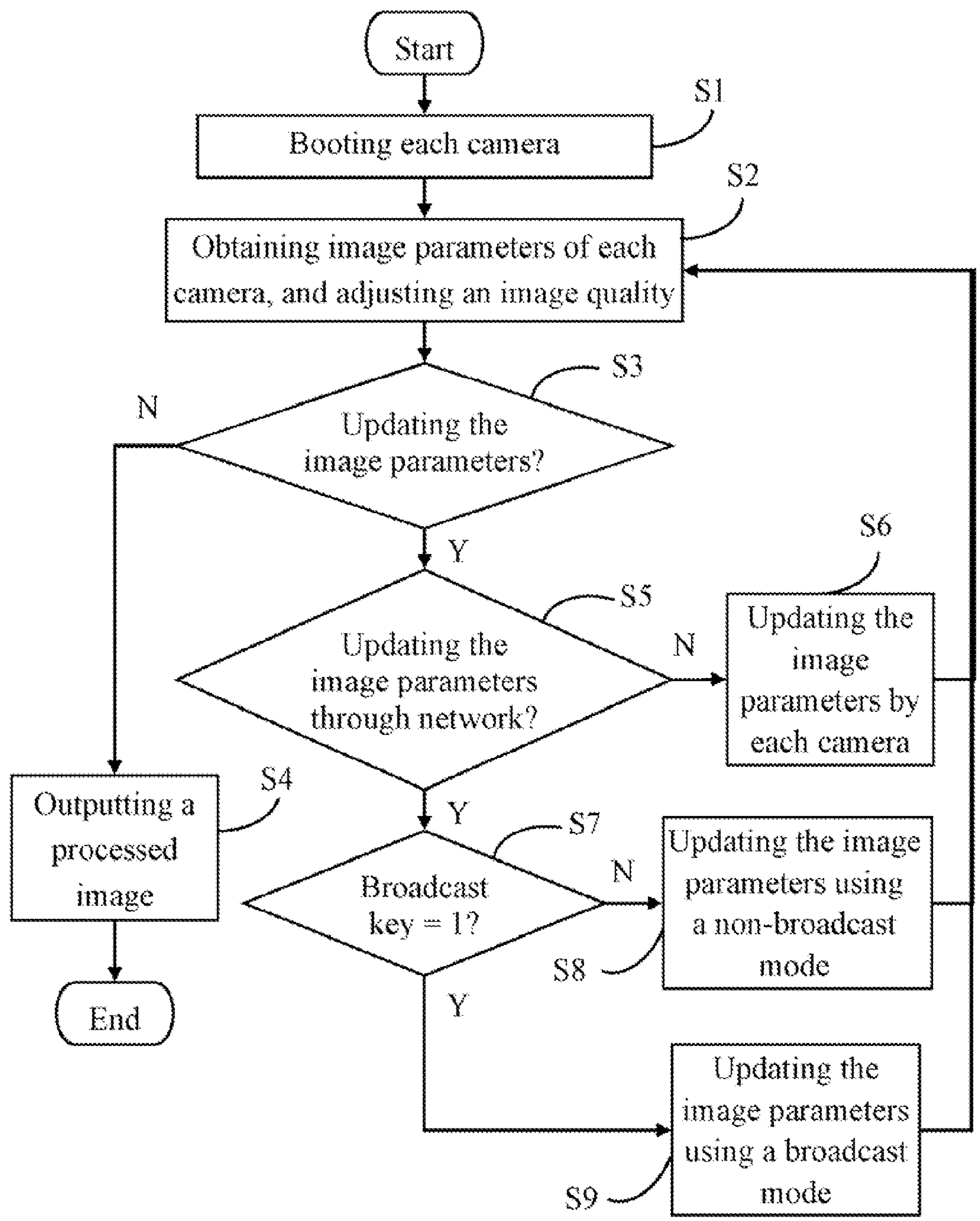
FIG. 4 is a flowchart of one embodiment of a method for adjusting image parameters of cameras.

FIG. 4 is a flowchart of one embodiment of a method for adjusting image parameters of cameras. Depending on the embodiment, additional blocks may be added, others removed, and the ordering of the blocks may be changed.

In block S1, the booting module 201 boots each of the plurality of cameras 1, and runs initial processes in each of the plurality of cameras 1 to perform an initialization operation for the initial processes.

In block S2, the adjusting module 202 obtains image parameters (i.e., default image parameters) of each of the plurality of cameras 1 from the default image parameter area 12 of the storage system 10 of each of the plurality of cameras 1 through the network 3, and adjusts an image quality of a captured image of each of the plurality of cameras 1 according to the image parameters.

In block S3, the determining module 203 determines if there are disqualified cameras 1 whose image parameters need to be adjusted according to the image quality of the captured image of each of the plurality of cameras 1. For example, if the image quality of the captured image of one of the plurality of cameras 1 is acceptable, the determining module 203 determines that the camera 1 is qualified, and the image parameters of the camera 1 do not need to be adjusted, the procedure goes to block S4. If the image quality of the captured image of one of the plurality of cameras 1 is not acceptable, the determining module 203 determines that the camera 1 is disqualified, and the image parameters of the camera 1 need to be adjusted, the procedure goes to block S5.

In block S4, the processing module 204 processes the captured image of each of qualified cameras 1 whose image parameters do not need to be adjusted, and outputs a processed image of each of the qualified cameras 1 on the display 29 of the computer 2. In one embodiment, the processing module 204 processes the captured image of each of the qualified cameras by filtering noise in the captured images of each of the qualified cameras.

In block S5, the determining module 203 determines if the image parameters of each of the disqualified cameras are adjusted by the computer 2 through the network 3. If the image parameters of each of the disqualified cameras are not adjusted by the computer 2 through the network 3, the procedure goes to block S6. If the image parameters of each of the disqualified cameras are adjusted by the computer 2 through the network 3, the procedure goes to block S7.

In block S6, the image parameters are updated by each of the disqualified cameras 1 itself. In one embodiment, each of the disqualified cameras 1 updates the default image parameters in the default image parameter area 12 with new image parameters stored in the SD card 14.

In block S7, the determining module 203 determines if the image parameters of each of the disqualified cameras 1 have been adjusted using a broadcast mode. In one embodiment, if a broadcast key of each of the disqualified cameras 1 is equal to zero, the determining module 203 determines that the image parameters of the disqualified cameras 1 have been adjusted using a non-broadcast mode, the procedure goes to block S8. If the broadcast key of each of the disqualified cameras 1 is equal to one, the determining module 203 determines that the image parameters of the disqualified cameras 1 have been adjusted using the broadcast mode, the procedure goes to block S9.

In block S8, the updating module 205 updates the image parameters in the default image parameter area 12 of the storage system 10 of each of the disqualified cameras 1 in succession with the user-defined values using the non-broadcast mode through the network 3. Then, the procedure returns to block S2.

In block S9, the updating module 205 updates the image parameters in the default image parameter area 12 of the storage system 10 of each of the disqualified cameras 1 synchronized with the user-defined values using the broadcast mode through the network 3. Then, the procedure returns to block S2.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for adjusting image parameters of cameras, comprising:

(a) obtaining image parameters of each of the cameras from a storage system of each of the cameras, and adjusting an image quality of a captured image of each of the cameras according to the image parameters;

(b) determining if there are disqualified cameras whose image parameters need to be adjusted according to the image quality of the captured image of each of the cameras;

(c) processing the captured image of each of qualified cameras whose image parameters do not need to be adjusted, and outputting a processed image of each of the qualified cameras on a display; or (d) determining if the image parameters of each of the disqualified cameras are adjusted by the computer through a network;

(e) updating the image parameters by each of the disqualified cameras itself if the image parameters of each of the disqualified cameras are not adjusted by the computer through the network, and returning to step (a);

(f) determining if the image parameters of each of the disqualified cameras have been adjusted using a broadcast mode under the condition that the image parameters of each of the disqualified cameras are adjusted by the computer through the network; and (g) updating the image parameters of each of the disqualified cameras using the broadcast mode or a non-broadcast mode with user-defined values, and returning to step (a);

wherein the image parameters of each of the cameras are stored in a default image parameter area of the storage system of each of the cameras;

wherein step (f) comprises: determining that the image parameters of the disqualified cameras have been adjusted using a non-broadcast mode if a broadcast key of each of the disqualified cameras is equal to zero; and determining that the image parameters of the disqualified cameras have been adjusted using the broadcast mode if the broadcast key of each of the disqualified cameras is equal to one;

wherein step (g) comprises: updating the image parameters in the default image parameter area of the storage system of each of the disqualified cameras in succession with the user-defined values using the non-broadcast mode through the network if the broadcast key of the disqualified camera is equal to zero; and updating the image parameters in the default image parameter area of the storage system of each of the disqualified cameras synchronized with the user-defined values using the broadcast mode through the network if the broadcast key of the disqualified camera is equal to one.

2. The method according to claim 1, wherein step (b) comprises: determining that the image parameters of a camera do not need to be adjusted if the image quality of the captured image of the camera is acceptable; or determining that the image parameters of a camera need to be adjusted if the image quality of the captured image of the camera is not acceptable.

3. The method according to claim 1, wherein step (c) comprises: filtering noise in the captured images of each of the qualified cameras.

4. The method according to claim 1, wherein step (e) comprises: updating the image parameters in the default image parameter area with image parameters stored in a secure digital (SD) card of each of the disqualified cameras.

5. A non-transitory storage medium having stored thereon instructions that, when executed by a processor of a computer, causes the processor to perform a method for adjusting image parameters of cameras, the method comprising:

(a) obtaining image parameters of each of the cameras from a storage system of each of the cameras, and adjusting an image quality of a captured image of each of the cameras according to the image parameters;

(b) determining if there are disqualified cameras whose image parameters need to be adjusted according to the image quality of the captured image of each of the cameras;

(c) processing the captured image of each of qualified cameras whose image parameters do not need to be adjusted, and outputting a processed image of each of the qualified cameras on a display; or (d) determining if the image parameters of each of the disqualified cameras are adjusted by the computer through a network;

(e) updating the image parameters by each of the disqualified cameras itself if the image parameters of each of the disqualified cameras are not adjusted by the computer through the network, and returning to step (a);

(f) determining if the image parameters of each of the disqualified cameras have been adjusted using a broadcast mode under the condition that the image parameters of each of the disqualified cameras are adjusted by the computer through the network; and (g) updating the image parameters of each of the disqualified cameras using the broadcast mode or a non-broadcast mode with user-defined values, and returning to step (a);

wherein the image parameters of each of the cameras are stored in a default image parameter area of the storage system of each of the cameras;

wherein step (f) comprises: determining that the image parameters of the disqualified cameras have been adjusted using a non-broadcast mode if a broadcast key of each of the disqualified cameras is equal to zero; and determining that the image parameters of the disqualified cameras have been adjusted using the broadcast mode if the broadcast key of each of the disqualified cameras is equal to one;

wherein step (g) comprises: updating the image parameters in the default image parameter area of the storage system of each of the disqualified cameras in succession with the user-defined values using the non-broadcast mode through the network if the broadcast key of the disqualified camera is equal to zero; and updating the image parameters in the default image parameter area of the storage system of each of the disqualified cameras synchronized with the user-defined values using the broadcast mode through the network if the broadcast key of the disqualified camera is equal to one.

6. The non-transitory storage medium according to claim 5, wherein step (b) comprises: determining that the image parameters of a camera do not need to be adjusted if the image quality of the captured image of the camera is acceptable; or determining that the image parameters of a camera need to be adjusted if the image quality of the captured image of the camera is not acceptable.

7. The non-transitory storage medium according to claim 5, wherein step (c) comprises: filtering noise in the captured images of each of the qualified cameras.

8. The non-transitory storage medium according to claim 5, wherein step (e) comprises: updating the image parameters in the default image parameter area with image parameters stored in a secure digital (SD) card of each of the disqualified cameras.

9. The non-transitory storage medium according to claim 5, wherein the medium is selected from the group consisting of a hard disk drive, a compact disc, a digital video disc, and a tape drive.

10. A computing system for adjusting image parameters of cameras, comprising:

a processor;

a storage system storing a plurality of instructions, which when executed by the processor, causes the processor to:

to obtain image parameters of each of the cameras from a storage system of each of the cameras, and adjusting an image quality of a captured image of each of the cameras according to the image parameters;

determine if there are disqualified cameras whose image parameters need to be adjusted according to the image quality of the captured image of each of the cameras;

process the captured image of each of qualified cameras whose image parameters do not need to be adjusted, and output a processed image of each of the qualified cameras on a display;

determine if the image parameters of each of the disqualified cameras are adjusted by the computer through a network;

update the image parameters by each of the disqualified cameras itself if the image parameters of each of the disqualified cameras are not adjusted by the computer through the network;

determine if the image parameters of each of the disqualified cameras have been adjusted using a broadcast mode under the condition that the image parameters of each of the disqualified cameras are adjusted by the computer through the network; and update the image parameters of each of the disqualified cameras using the broadcast mode or a non-broadcast mode with user-defined values;

wherein the image parameters of each of the cameras are stored in a default image parameter area of the storage system of each of the cameras;

wherein the determining if the image parameters of each of the disqualified cameras have been adjusted using a broadcast mode is performed by:

determining that the image parameters of the disqualified cameras have been adjusted using a non-broadcast mode if a broadcast key of each of the disqualified cameras is equal to zero; and determining that the image parameters of the disqualified cameras have been adjusted using the broadcast mode if the broadcast key of each of the disqualified cameras is equal to one;

wherein the updating the image parameters of each of the disqualified cameras using the broadcast mode or the non-broadcast mode with user-defined values is performed by:

updating the image parameters in the default image parameter area of the storage system of each of the disqualified cameras in succession with the user-defined values using the non-broadcast mode through the network if the broadcast key of the disqualified camera is equal to zero; and updating the image parameters in the default image parameter area of the storage system of each of the disqualified cameras synchronized with the user-defined values using the broadcast mode through the network if the broadcast key of the disqualified camera is equal to one.

11. The system according to claim 10, wherein updating the image parameters by each of the disqualified cameras is performed by: updating the image parameters in the default image parameter area with image parameters stored in a secure digital (SD) card of each of the disqualified cameras.

* * * * *